US008775777B2

(12) United States Patent (10) Patent No.: US 8,775,777 B2
Bergland et al. (45) Date of Patent: Jul. 8, 2014

(54) TECHNIQUES FOR SOURCING IMMEDIATE VALUES FROM A VLIW

(75) Inventors: Tyson J. Bergland, Palo Alto, CA (US); Craig M. Okruhlica, San Jose, CA (US); Michael J. M. Toksvig, Palo Alto, CA (US); Justin M. Mahan, Fremont, CA (US); Edward A. Hutchins, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 499 days.

(21) Appl. No.: 11/893,584

(22) Filed: Aug. 15, 2007

(65) Prior Publication Data

US 2009/0049276 A1 Feb. 19, 2009

(51) Int. Cl.
*G06F 15/76* (2006.01)

(52) U.S. Cl.
USPC ............................................. 712/24; 712/214

(58) Field of Classification Search
USPC .................................................. 712/24, 214
See application file for complete search history.

(56) References Cited

U.S. PATENT DOCUMENTS

| | | | |
|---|---|---|---|
| 4,620,217 A | 10/1986 | Songer | |
| 4,648,045 A | 3/1987 | Demetrescu | |
| 4,700,319 A | 10/1987 | Steiner | |
| 4,862,392 A | 8/1989 | Steiner | |
| 4,901,224 A | 2/1990 | Ewert | |
| 5,185,856 A | 2/1993 | Alcorn et al. | |
| 5,357,604 A | 10/1994 | San et al. | |
| 5,392,393 A | 2/1995 | Deering | |
| 5,491,496 A | 2/1996 | Tomiyasu | |
| 5,577,213 A | 11/1996 | Avery et al. | |
| 5,581,721 A | 12/1996 | Wada et al. | |
| 5,600,584 A | 2/1997 | Schlafly | |
| 5,655,132 A | 8/1997 | Watson | |
| 5,850,572 A | 12/1998 | Dierke | |
| 5,941,940 A | 8/1999 | Prasad et al. | |
| 5,977,977 A | 11/1999 | Kajiya et al. | |
| 6,118,452 A | 9/2000 | Gannett | |
| 6,173,366 B1 | 1/2001 | Thayer et al. | |
| 6,333,744 B1 | 12/2001 | Kirk et al. | |
| 6,351,806 B1 * | 2/2002 | Wyland ......................... 712/225 |
| 6,353,439 B1 | 3/2002 | Lindholm et al. | |

(Continued)

FOREIGN PATENT DOCUMENTS

| | | | |
|---|---|---|---|
| JP | 62080785 A2 | 4/1987 |
| JP | 05150979 A2 | 6/1993 |

(Continued)

OTHER PUBLICATIONS

Hennessy et al., Computer Organization and Design: The Hardware / Software Interface, 1997, Section 6.5.*

(Continued)

*Primary Examiner* — Corey S Faherty

(57) ABSTRACT

Sourcing immediate values from a very long instruction word includes determining if a VLIW sub-instruction expansion condition exists. If the sub-instruction expansion condition exists, operation of a portion of a first arithmetic logic unit component is minimized. In addition, a part of a second arithmetic logic unit component is expanded by utilizing a block of a very long instruction word, which is normally utilized by the first arithmetic logic unit component, for the second arithmetic logic unit component if the sub-instruction expansion condition exists.

19 Claims, 8 Drawing Sheets

(56) References Cited

U.S. PATENT DOCUMENTS

| | | |
|---|---|---|
| 6,466,222 B1 | 10/2002 | Kao et al. |
| 6,496,537 B1 | 12/2002 | Kranawetter et al. |
| 6,526,430 B1 | 2/2003 | Hung et al. |
| 6,557,022 B1 | 4/2003 | Sih et al. |
| 6,624,818 B1 | 9/2003 | Mantor et al. |
| 6,636,221 B1 | 10/2003 | Morein |
| 6,636,223 B1 | 10/2003 | Morein |
| 6,778,181 B1 | 8/2004 | Kilgariff et al. |
| 6,806,886 B1 | 10/2004 | Zatz |
| 6,839,828 B2 * | 1/2005 | Gschwind et al. ............ 712/20 |
| 6,924,808 B2 | 8/2005 | Kurihara et al. |
| 6,947,053 B2 | 9/2005 | Malka et al. |
| 6,980,209 B1 | 12/2005 | Donham et al. |
| 6,999,100 B1 | 2/2006 | Leather et al. |
| 7,280,112 B1 | 10/2007 | Hutchins |
| 7,298,375 B1 | 11/2007 | Hutchins |
| 7,477,260 B1 | 1/2009 | Nordquist |
| 7,659,909 B1 | 2/2010 | Hutchins |
| 7,710,427 B1 | 5/2010 | Hutchins et al. |
| 7,928,990 B2 | 4/2011 | Jiao et al. |
| 7,941,645 B1 | 5/2011 | Riach et al. |
| 2002/0129223 A1 * | 9/2002 | Takayama et al. ............ 712/24 |
| 2002/0169942 A1 | 11/2002 | Sugimoto |
| 2003/0115233 A1 | 6/2003 | Hou et al. |
| 2004/0114813 A1 | 6/2004 | Boliek et al. |
| 2004/0130552 A1 | 7/2004 | Duluk, Jr. et al. |
| 2005/0122330 A1 | 6/2005 | Boyd et al. |
| 2005/0135433 A1 | 6/2005 | Chang et al. |
| 2005/0223195 A1 * | 10/2005 | Kawaguchi .................. 712/214 |
| 2006/0028469 A1 | 2/2006 | Engel |
| 2006/0152519 A1 | 7/2006 | Hutchins et al. |
| 2006/0155964 A1 | 7/2006 | Totsuka |
| 2006/0177122 A1 | 8/2006 | Yasue |
| 2006/0288195 A1 | 12/2006 | Ma et al. |
| 2007/0279408 A1 | 12/2007 | Zheng et al. |
| 2007/0285427 A1 | 12/2007 | Morein et al. |

FOREIGN PATENT DOCUMENTS

| | | |
|---|---|---|
| JP | 07084965 | 3/1995 |
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2004303026 | 10/2004 |
| JP | 2006196004 | 7/2006 |
| JP | 2008161169 | 7/2008 |
| WO | 2005114646 A2 | 12/2005 |

OTHER PUBLICATIONS

Mocrosoft; (Complete) Tutorial to Understand IEEE Floating-Point Errors; http://support.microsoft.com/kb/42980; dated Aug. 16, 2005, retrieved Oct. 21, 2010.

Hollasch, IEEE Standard 754 Floating Point Numbers; http://steve.hollasch.net/cgindex/coding/ieeefloat.html; dated Feb. 24, 2005; retrieved Oct. 21, 2010.

Moller et al., Real-Time Rendering, 2nd ed., 2002, A K Peters Ltd., pp. 92-99, 2002.

"Interleaved Memory." Dec. 26, 2002. http://www.webopedia.com/Term/I/interleaved_memory.html.

Pirazzi, Chris. "Fields, F1/F2, Interleave, Field Dominance and More." Nov. 4, 2001. http://lurkertech.com/lg/dominance.html.

The Free Online Dictionary, Thesaurus and Encyclopedia, definition for cache; http://www.thefreedictionary.com/cache; retrieved Aug. 17, 2012.

* cited by examiner

TECHNIQUES FOR SOURCING IMMEDIATE VALUES FROM A VLIW

BACKGROUND OF THE INVENTION

An image is typically represented as a raster (an array) of logical picture elements (pixels). Pixel data corresponding to certain surface attributes of an image (e.g. color, depth, texture, etc.) are assigned to each pixel and the pixel data determines the nature of the projection on a display screen area associated with the logical pixel. Conventional three dimensional graphics processors typically involve extensive and numerous sequential stages or "pipeline" type processes that manipulate the pixel data in accordance with various vertex parameter values and instructions to map a three dimensional scene in the world coordinate system to a two dimensional projection (e.g., on a display screen) of an image. A relatively significant amount of processing and memory resources are usually required to implement the numerous stages of a traditional pipeline. However, conventional arithmetic logic units (ALUs) typically implement a multi-pass processing stage that includes multiple arithmetic logic sub-units arranged in parallel. In addition, conventional ALUs typically have a limited number of registers for storing variables and constants.

A number of new categories of devices (e.g., such as portable game consoles, portable wireless communication devices, portable computer systems, etc.) are emerging where size and power consumption are a significant concern. Many of these devices are small enough to be held in the hands of a user making them very convenient and the display capabilities of the devices are becoming increasingly important as the underlying fundamental potential of other activities (e.g., communications, game applications, internet applications, etc.) are increasing. However, the resources (e.g., processing capability, storage resources, etc.) of a number of the devices and systems are usually relatively limited. These limitations can make retrieving, coordinating and manipulating information associated with a final image rendered or presented on a display very difficult or even impossible. In addition, traditional graphics information processing can consume significant power and be a significant drain on limited power supplies, such as a battery. For example, floating point calculations in traditional graphics systems often use significant resources and consume relatively large amounts of power.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Figure 1:
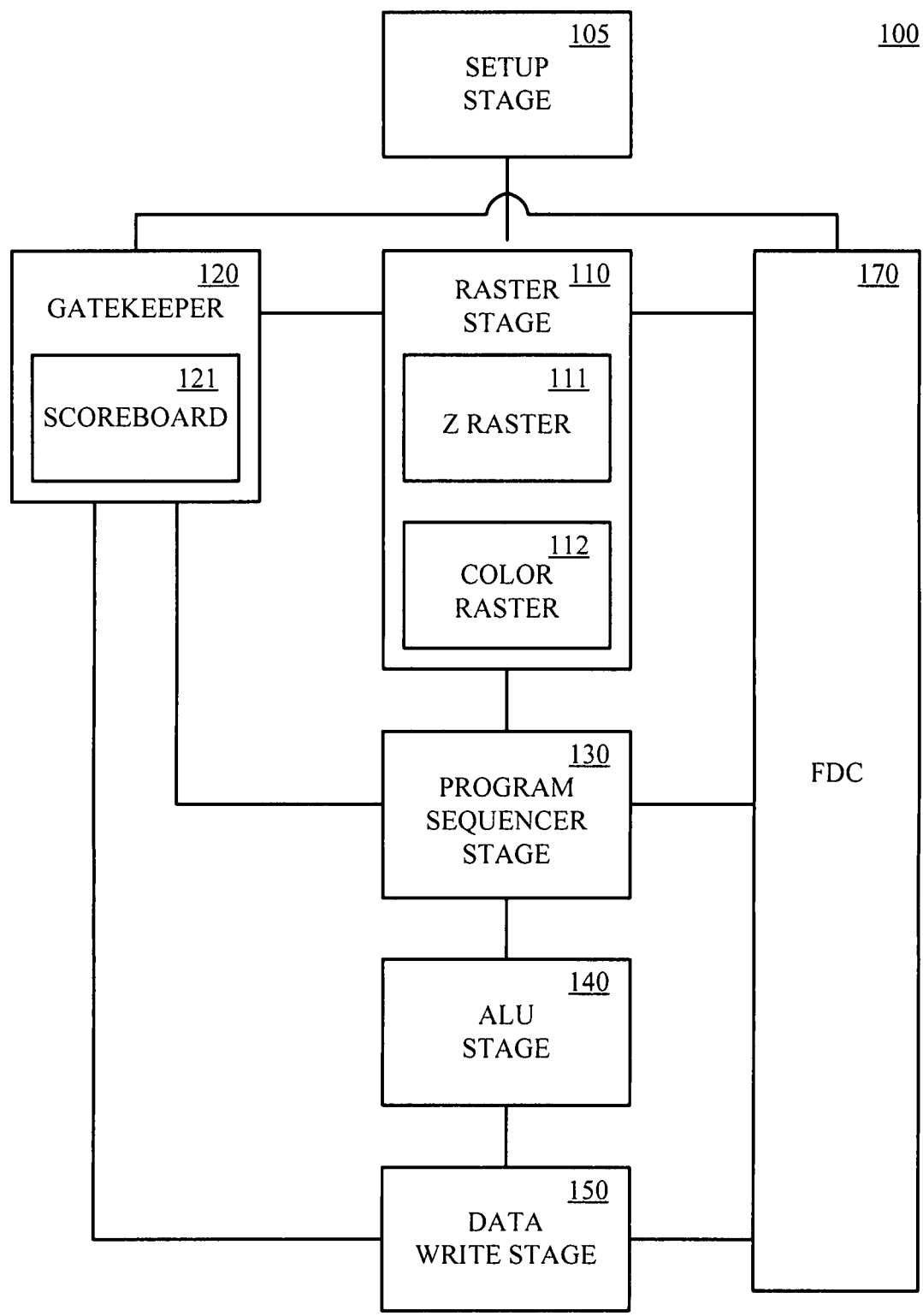
FIG. 1 shows a block diagram of an exemplary graphics pipeline in accordance with one embodiment of the present technology.

FIG. 1 shows an exemplary graphics pipeline 100, in accordance with one embodiment of the present technology. The graphics pipeline facilitates efficient and effective utilization of processing resources. In one embodiment, the graphics pipeline processes graphics information in an organized and coordinated manner. The graphics pipeline can be implemented as a graphics processing core in a variety of different components (e.g., in a graphics processing chip or unit, in an application specific integrated circuit, a central processing unit, integrated in a host processing unit, etc.). Various aspects of the graphics pipeline are described in portions of the following description as operating upon graphics primitives, (e.g., triangles) as a matter of convenient convention. It is appreciated that the present technology is readily adaptable and can be also implemented utilizing a variety of other geometrical primitives.

The graphics pipeline includes a setup stage 105, a raster stage 110, a gatekeeper stage 120, a program sequence stage 130, an arithmetic logic unit stage 140 and a data write stage 150. In one implementation, a host provides the graphics pipeline with vertex data (e.g., points in three dimensional space that are being rendered), commands for rendering particular triangles given the vertex data, and programming information for the pipeline (e.g., register writes for loading instructions into different graphics pipeline stages). The stages of graphics pipeline cooperatively operate to process graphics information.

The setup stage receives vertex data and prepares information for processing in the graphics pipeline. The setup stage can perform geometrical transformation of coordinates, perform viewport transforms, perform clipping and prepare perspective correct parameters for use in the raster stage, including parameter coefficients. In one embodiment, the setup stage applies a user defined view transform to vertex information (e.g., x, y, z, color and/or texture attributes, etc.) and determines screen space coordinates for each triangle. The setup stage can also support guard-band clipping, culling of back facing triangles (e.g., triangles facing away from a viewer), and determining interpolated texture level of detail (e.g., level of detail based upon triangle level rather than pixel level). In addition, the setup stage can collect statistics and debug information from other graphics processing blocks.

The setup stage can include a vertex buffer (e.g., vertex cache) that can be programmably controlled (e.g., by software, a driver, etc.) to efficiently utilize resources (e.g., for different bit size word vertex formats). For example, transformed vertex data can be tracked and saved in the vertex buffer for future use without having to perform transform operations for the same vertex again. In one implementation, the setup stage sets up barycentric coefficients for raster. In an exemplary implementation, the setup stage is a floating point very long instruction word (VLIW) machine that supports 32-bit IEEE floating point, S15.16 fixed point and packed 0.8 fixed point formats.

The raster stage determines which pixels correspond to a particular triangle and interpolates parameters from the setup stage associated with the triangle to provide a set of interpolated parameter variables and instruction pointers or sequence numbers associated with (e.g., describing) each pixel. For example, the raster stage can provide a "translation" or rasterization from a triangle view to a pixel view of an image. In one implementation, raster stage scans or iterates each pixel in an intersection of a triangle and a scissor rectangle. For example, the raster stage can process pixels of a given triangle and determine which processing operations are appropriate for pixel rendering (e.g., operations related to color, texture, depth and fog, etc.). The raster stage can support guard band (e.g., +/−1K) coordinates providing efficient guard-band rasterization of on-screen pixels and facilitates reduction of clipping operations. In one exemplary implementation, the raster stage is compatible with Open GL-ES and D3DM rasterization rules. The raster stage is also programmable to facilitate reduction of power that would otherwise be consumed by unused features and faster rendering of simple drawing tasks, as compared to a hard-coded rasterizer unit in which features consume time or power (or both) whether or not they are being used.

In one implementation, the raster stage also generates pixel packets utilized in the graphics pipeline. Each pixel packet includes one or more rows and each row includes a payload portion and a sideband portion. A payload portion includes fields for various values including interpolated parameter values (e.g., values that are the result of raster interpolation operations). For example, the fields can be created to hold values associated with pixel surface attributes (e.g., color, texture, depth, fog, (x,y) location, etc.). Instruction sequence numbers associated with the pixel processing are assigned to the pixel packets and placed in an instruction sequence field of the sideband portion. The sideband information also includes a status field (e.g., kill field).

In one implementation, the raster stage calculates barycentric coordinates for pixel packets. In a barycentric coordinate system, distances in a triangle are measured with respect to its vertices. The use of barycentric coordinates reduces the required dynamic range, which permits using fixed point calculations that require less power than floating point calculations. In one implementation, the raster stage can also interleave even number pixel rows and odd number pixel rows to account for multiclock cycle latencies of downstream pip-estages.

The graphics pipeline system and method can facilitate efficient utilization of resources by limiting processing on pixels that do not contribute to an image display presentation. The Z Raster stage 111 performs an analysis to determine relatively "early" in the graphics pipeline if a pixel contributes to the image display presentation. For example, an analysis of whether a pixel is occluded (e.g., has values associated with "hidden" surfaces that do not contribute to an image display presentation) is performed. In one implementation, a pixel packet row is not clocked through (e.g., CMOS components for the payload portion do not switch) for killed pixels. The present invention can prevent power being consumed on processing for pixels that would otherwise be discarded at the end of the pipeline. The raster stage removes pixel information (e.g., pixel packet rows) associated with the pixel from the pipeline if the information does not contribute to the image display presentation and notifies the gatekeeper stage. Color raster stage 112 performs color raster operations.

In one implementation, the Z raster is done at a faster rate than color raster. In one exemplary implementation, the Z raster operations are performed on four pixels at a time and the pixels that are discarded are "finished" faster than the pixels that go through color rasterizing. The discarding of some pixels, while others rasterized at the same time proceed to the lower stages of the pipeline, introduce timing issues that are handled by the scoreboarding and program sequencing described below. The scoreboarding and program sequencing also handle timing issues associated with variable length programmable shader operations that can include re-circulating a pixel through pipeline stages multiple passes.

The gatekeeper stage regulates the flow of pixels to lower stages of graphics pipeline. In an exemplary implementation, gatekeeper also collects debug readback information from other graphics pipeline stages. In one implementation, the gatekeeper stage facilitates data coherency maintenance of data fetching and data writing. For example, the gatekeeper stage can prevent read-modify-write hazards by coordinating entrance of coincident pixels into subsequent stages of graphics pipeline with on going read-modify-write operations.

In one embodiment, the gatekeeper stage utilizes scoreboarding techniques to track and identify coincident pixel issues. The gatekeeper stage can also utilize the scoreboard to tracks pixels that finish processing through the pipeline (e.g., by being written to memory or being killed). The scoreboard facilitates coordination of pixels in a pipeline to maintain an appropriate processing flow (e.g., the order in which an application drew a triangle). For example, it is possible for an application to direct one triangle to be rendered over the top of another triangle and it is possible for a pixel associated with the second triangle to be coincident (e.g., have the same screen location) with a pixel from the first triangle.

The scoreboard tracks the screen locations of pixels that are "in flight" and being processed by downstream stages of the graphics pipeline. The scoreboard prevents a hazard where one pixel in a triangle is coincident ("on top of") another pixel being processed and in flight but not yet retired. For example, when a pixel packet is received at the gatekeeper stage, the screen location for the pixel packet is stored at the scoreboard. When a second pixel packet having the same screen location is received, the scoreboard indicates that another pixel with that screen location is currently being processed by downstream stages of the graphics pipeline. The scoreboard may be implemented as a bit mask. In an exemplary implementation, the bit mask is a grid of bits for indicating whether a pixel having a particular (x, y) location is busy (e.g., being processed by graphics pipeline).

In one implementation, the gatekeeper stage directs raster stage to stall propagation of the new pixel to downstream stages in response to detecting screen coincidence between the pixel and pixels currently processing. Upon completion of processing for a pixel packet, a message is sent from the data write stage to the gatekeeper stage indicating that the pixel has completed processing. In response to receiving the message, the scoreboard is updated to indicate that the screen location associated with the pixel is now free, and that processing can commence on another pixel having the same screen location. In one embodiment, the corresponding bit in a bit mask is cleared.

The program sequencer functions by controlling the operation of the other downstream components of the graphics pipeline. In one implementation, program sequencer works in conjunction with a graphics driver to implement a method for loading and executing a programmable shader. The program sequencer can interact with the graphics driver (e.g., a graphics driver executing on the CPU) to control the manner in which the functional modules of the graphics pipeline receive information, configure themselves for operation, and process graphics primitives. For example, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the lower pipeline stage over a common input from upstream pipeline stages (e.g., from an upstream raster module, from a setup module, or from the graphics driver).

In an exemplary implementation, the program sequencer directs execution of an indeterminate length shader program. As used herein, the term "indeterminate length" shader program refers to the fact that the shader programs that can be executed by a GPU are not arbitrarily limited by a predetermined, or format based, length. Thus for example, shader programs that can be executed can be short length shader programs (e.g., 16 to 32 instructions long, etc.), normal shader programs (e.g., 64 to 128 instructions long, etc.), long shader programs (e.g., 256 instructions long, etc.), very long shader programs (e.g., more than 1024 instructions long, etc), and so forth. In one implementation, program sequencer directs execution of indeterminate length shader programs by executing them in portions.

The program sequencer is also responsible for fetching (e.g., reading) a plurality of different data types (e.g., color data, depth data, texture data, etc.) from a memory in a single stage. In one embodiment, a variety of different types of surface attribute information from memory (fragment data cache (FDC)) 170, including surface information related to pixels (e.g., pixels generated by a rasterization module). The surface information can also be associated with a plurality of graphics functions to be performed on the pixels and wherein the surface information is stored in pixel information (e.g., a pixel packet) associated with the pixels. The plurality of graphics functions can include color blending and texture mapping. In an exemplary implementation, the program sequencer directs recirculation of pixel information through shading and texture operations for multiple passes or loops.

The arithmetic logic stage (e.g., an ALU) performs shading coordination operations on pixel packet row payload information (e.g., pixel surface attribute information) received from the data fetch stage. The arithmetic logic stage can also perform texture operations. The arithmetic logic unit stage and the operation thereof will be discussed below in greater detail.

The data write stage forwards pixel processing results (e.g., color results, Z-depth results, etc.) out to memory. In one embodiment, the data write stage forwards the results to the fragment data cache. In one exemplary implementation, data write stage forwards an indication to the scoreboard that the pixel is no longer in flight.

Figure 2:
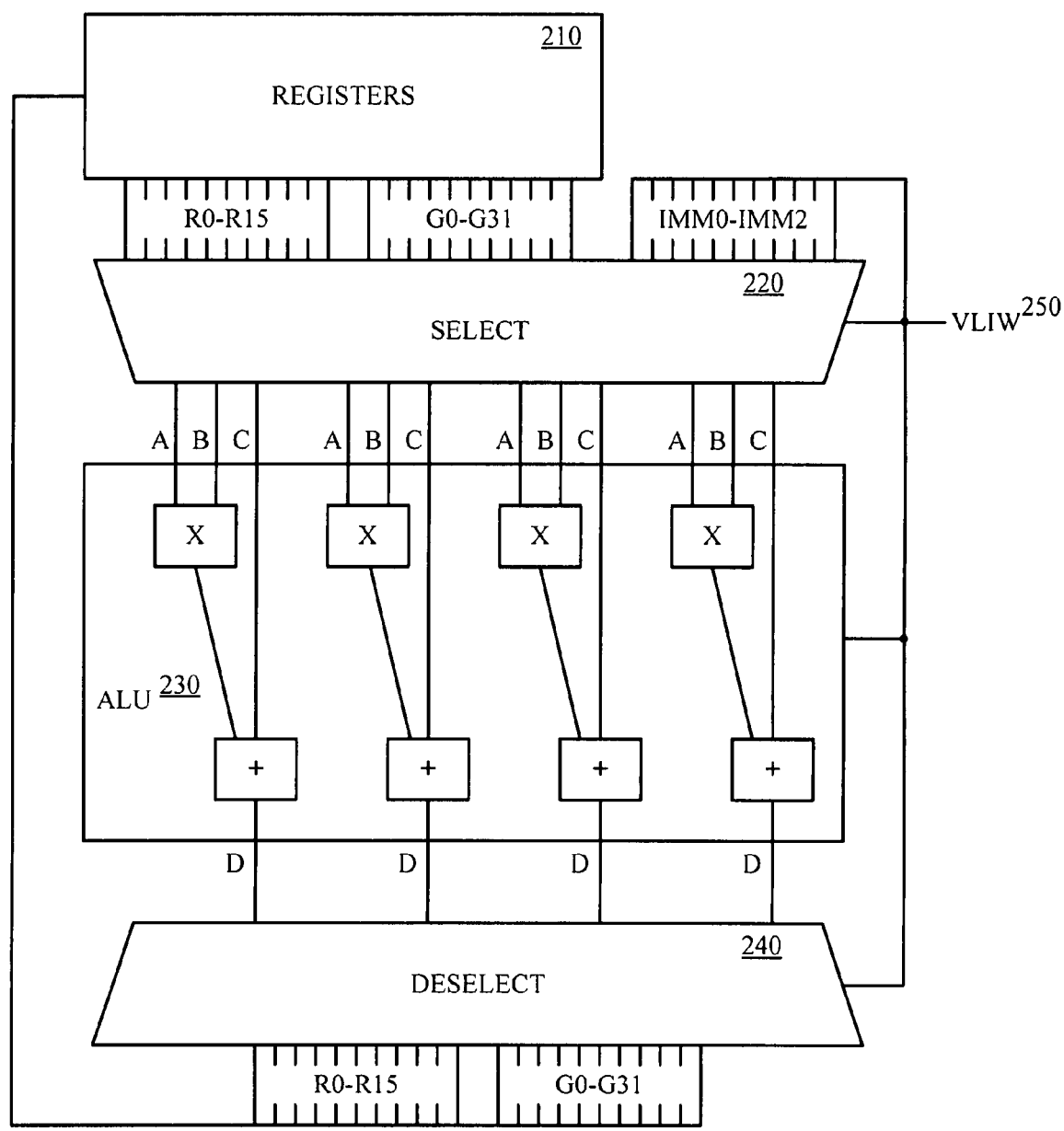
FIG. 2 shows a block diagram of a processing stage, in accordance with one embodiment of the present technology.
Figure 3:
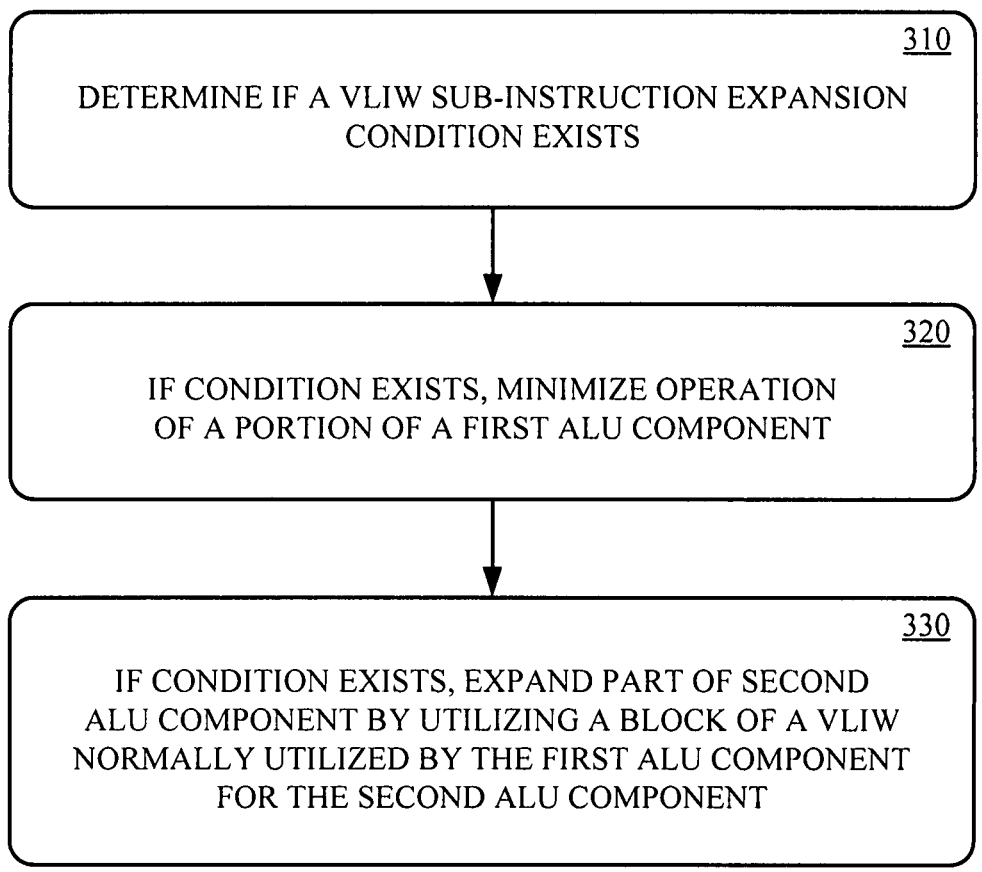
FIG. 3 shows a flow diagram of a method of performing arithmetic and logic operations, in accordance with one embodiment of the present technology.

FIG. 2 shows a processing stage 200, in accordance with one embodiment of the present technology. The processing stage is further described with reference to the method of performing arithmetic and logic operations, in accordance with one embodiment of the present technology, shown in FIG. 3. The processing stage 200 includes a plurality of registers 210, a selector 220, an arithmetic logic unit (ALU) 230, and a deselector 240.

The selector and ALU determine if a VLIW sub-instruction expansion condition exists, at 310. At 320, if a sub-instruction expansion condition exists, the ALU minimizes operation of a portion of a first ALU component. At 330, if a sub-instruction expansion condition exists, the selector and ALU expand part of a second ALU component by utilizing a block of a very long instruction word (VLIW) 250, which is normally utilized by the first ALU component, for the second ALU component. In one implementation, the selector and ALU expand operation of the second ALU component by sourcing a block of the VLIW, normally used to configure and control the first ALU component, as immediate inputs to the first ALU component.

The VLIW includes a plurality of blocks, wherein each block is generally associated with a corresponding ALU component. Each block of the VLIW is a predetermined number of bits wide. Each ALU component is configurable to implement one or more mathematical or logic operations.

Sub-instructions within the VLIW are effectively expanded by using one or more other sub-instructions in the VLIW as one or more additional immediates. Part of the VLIW, in particular, is decoded in a different manner such that one or more immediates are substituted in the VLIW in place of a given sub-instruction and the remaining sub-instructions expand to use the additional immediates. However, it is appreciated that the VLIW as a whole is not expanded.

Figure 4:
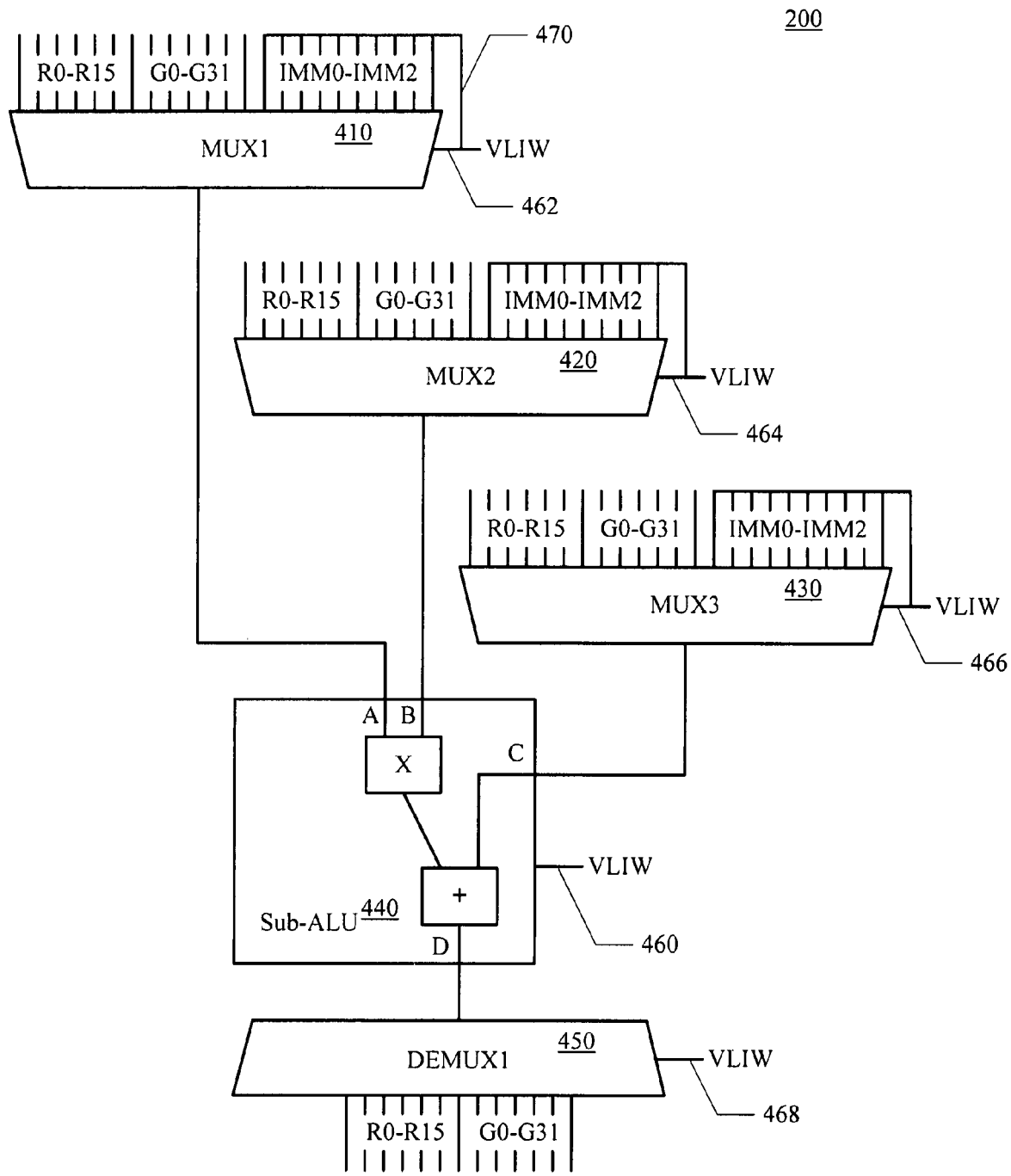
FIG. 4 shows a block diagram of an exemplary portion of a processing stage, in accordance with one embodiment of the present technology.

FIG. 4 shows an exemplary portion of the processing stage, in accordance with one embodiment of the present technology. The selector may include a plurality of demultiplexers 410, 420, 430, the ALU may include a plurality of sub-ALUs 440, and the deselector may include a plurality of demultiplexors 450. In an exemplary implementation, the ALU includes four sub-ALUs, wherein each sub-ALU includes a multiplier and an adder. In an exemplary implementation, the selector includes a separate multiplexer for each input of each sub-ALU. Similarly, the deselector includes a separate demultiplexer for each output of each sub-ALU. In one implementation, each block of the VLIW is a sub-instruction. In one implementation, one or more blocks of the VLIW each include up to three immediates and the other blocks of the VLIW are sub-instructions.

The plurality of registers include a set of registers for storing variables (R0-R15) and a set of registers for storing global constants (G0-G31). In an exemplary implementation, each register is twenty (20) bits wide. In an exemplary implementation, there are sixteen (16) registers for storing variables (R0-R15) and thirty-two (32) registers for storing global constants (G0-G31). Each multiplexer may couple any one of the plurality of registers to a given input of a corresponding sub-ALU. Additionally, each multiplexer may couple a block of the VLIW, normally used to configure and control another sub-ALU, as one or more immediates for input to the corresponding sub-ALU.

The VLIW configures and controls what each sub-ALU does during a given pass. In an exemplary implementation, the VLIW is two hundred fifty six (256) bits wide. A corresponding sixty-four (64) bit block of the VLIW configures and controls a respective sub-ALU. In an exemplary implementation, six (6) bits in a corresponding sixty-four (64) bit block causes a respective multiplexer to transfer a given register or immediate to a respective input (A) of a given sub-ALU. The respective multiplexer can therefore selects one of up to 64 registers or immediates as a corresponding input of a respective sub-ALU.

Figure 5A:
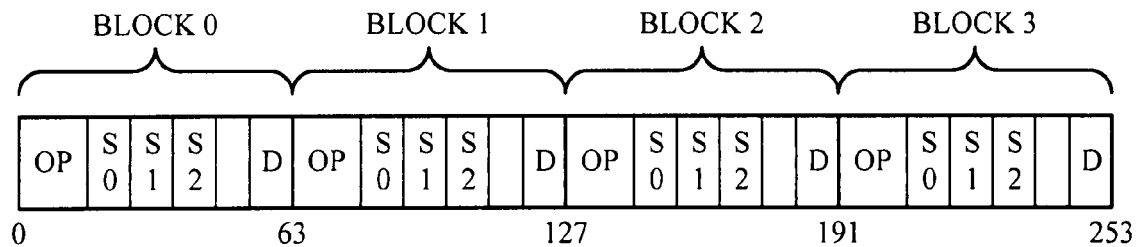
FIG. 5A shows a block diagram of a very long instruction word format, in accordance with one embodiment of the present technology.

FIG. 5A shows a very long instruction word format, in accordance with one embodiment of the present technology. The VLIW may include four blocks (BLOCK0-BLOCK3). Each block typically includes an opcode field (OP), first, second and third source fields (S0-S2), and a destination field (D). The opcode field of a given block (SUB-INSTR 0) is used as control signal inputs 460 to configure a respective sub-ALU, as illustrated in FIG. 4. The first source field (S0) may be used as control signal inputs 462 to a first multiplexer (MUX1) to select a particular one of the registers or a particular immediate. The second source field (S1) may be used as control signal inputs 464 to a second multiplexer (MUX2) to select a particular one of the registers or a particular immediate. The third source field (S2) may be used as control signal inputs 466 to a third multiplexer (MUX3) to select a particular one of the registers or a particular immediate. The destination field (D) may be used as control signal inputs 468 to a demultiplexer (DEMUX1) to select a particular one of the registers to store the results of the sub-ALU into.

Figure 5B:
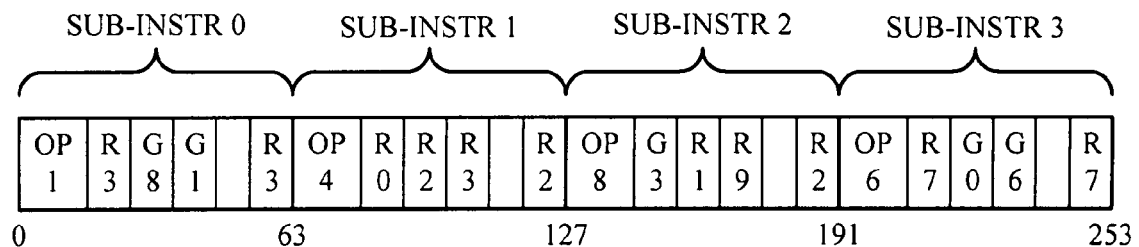
FIG. 5B shows a block diagram of an exemplary very long instruction word, in accordance with one embodiment of the present technology.

FIG. 5B shows an exemplary very long instruction word, in accordance with one embodiment of the present technology. The VLIW includes four sub-instructions. Each sub-instruction includes a bit pattern (e.g., 00101110) in the opcode field that specifies a given opcode (e.g., OP1). The given sub-instruction also includes bit patterns in each of the source and destination fields that specific a given register to couple to the respective input of a given sub-ALU. For example, bit patterns 000000-001111 may specify respective variable registers R0-R15, and bit patterns 010000-100000 may specify respective global constant registers G0-G31. As illustrated, the bit pattern OP1 in the first sub-instruction (SUB-INSTR0) may configure the sub-ALU in FIG. 4 to perform a particular arithmetic or logic function. The first source field (S0) contains a bit pattern that causes the first multiplexer (MUX1) in FIG. 4 to couple register R3 to the first input (A) of the sub-ALU. The second source field (S1) contains a bit pattern that causes the second multiplexer (MUX2) in FIG. 4 to couple register G8 to the second input (B) of the sub-ALU. The third source field (S2) contains a bit pattern that causes the third multiplexer (MUX3) in FIG. 4 to couple register G1 to the third input (C) of the sub-ALU. The destination field (D) contains a bit pattern that causes the demultiplexer (DEMUX) in FIG. 4 to couple the output (D) of the sub-ALU to register R3.

Figure 5C:
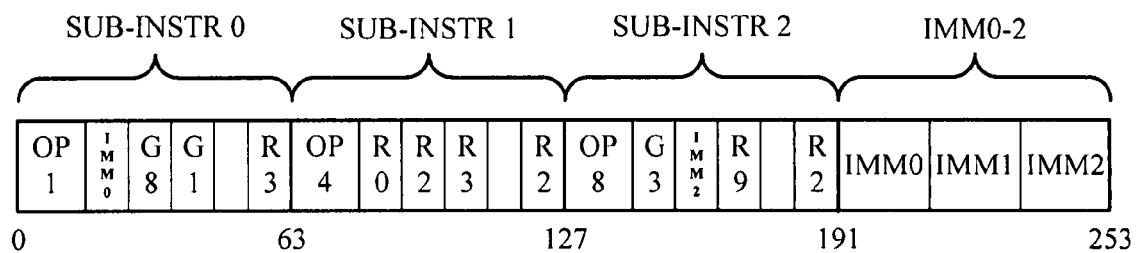
FIG. 5C shows a block diagram of an exemplary very long instruction word, in accordance with another embodiment of the present technology.

FIG. 5C shows an exemplary very long instruction word, in accordance with one embodiment of the present technology. A given sub-instruction (SUB-INSTR 0) includes a bit pattern (e.g., 00101110) in the opcode field that specifies a given opcode (e.g., OP1). The given sub-instruction also includes bit patterns in each of the source and destination fields that specify a given register to couple to the respective input of a given sub-ALU. For example, bit patterns 000000-001111 may specify respective variable registers R0-R15, and bit patterns 010000-100000 may specify respective global constant registers G0-G31. Furthermore, one or more of the source fields in one or more of the sub-instructions may contain a bit pattern that specifies that another sub-instruction contains an immediate to be coupled to the respective input of a given sub-ALU. For example, bit patterns 111101-111111 may specify respective immediate values IMM0-IMM2. As illustrated, the bit pattern OP1 in the first sub-instruction (SUB-INSTR0) may configure the sub-ALU in FIG. 4 to perform a particular arithmetic or logic function. The first source field (S0) contains a bit pattern that causes the first multiplexer (MUX1) in FIG. 4 to couple IMM0 in the last block (IMM0-2) of the VLIW 470 to the first input (A) of the sub-ALU. The second source field (S1) contains a bit pattern that causes the second multiplexer (MUX2) in FIG. 4 to couple register G8 to the second input (B) of the sub-ALU. The third source field (S2) contains a bit pattern that causes the third multiplexer (MUX3) in FIG. 4 to couple register G1 to the third input (C) of the sub-ALU. The destination field (D) contains a bit pattern that causes the demultiplexer (DEMUX) in FIG. 4 to couple the output (D) of the sub-ALU to register R3. Accordingly, part of the VLIW is decoded in a different manner such that one or more immediates are substituted in the VLIW in place of a given sub-instruction and the remaining sub-instructions expand to use the additional immediates. Furthermore, the presence of a bit pattern specifying an immediate value in any of the source fields causes the sub-ALU corresponding to the block that is being utilized for specifying the immediate values to be turned off.

Figure 6:
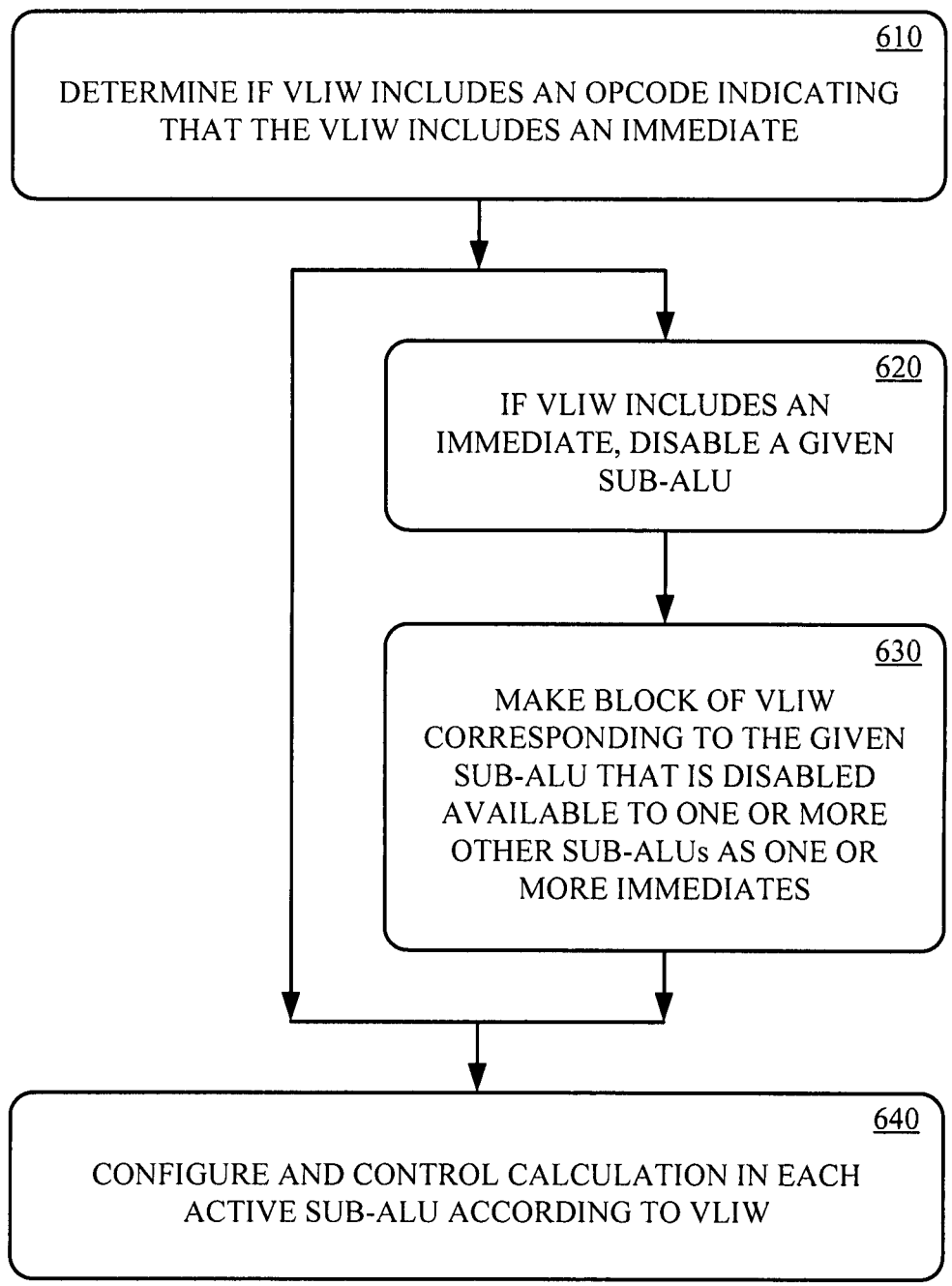
FIG. 6 shows a flow diagram of an exemplary method of controlling operation of a processing stage, in accordance with one embodiment of the present technology.

FIG. 6 shows an exemplary method of controlling operation of a processing stage, in accordance with one embodiment of the present technology. For each pass it is determined if the VLIW includes an encoding (e.g., operand and/or opcode) indicating that the VLIW includes one or more immediates, at 610. In another implementation, one or more predetermined bits (e.g., flag) of the VLIW indicate whether the VLIW includes one or more immediates.

At 620, if the VLIW includes an immediate, one or more given sub-ALUs are disabled. In one implementation, any of the plurality of sub-ALUs may be disabled. In another implementation, a predetermined bit of the VLIW indicates which sub-ALU is disabled. In another implementation, a particular sub-ALU may be easier to disable than the other sub-ALUs. Therefore, the sub-ALU, which is the easiest to disable, is the sub-ALU that is disabled each time. In another implementation, one sub-ALU may be less powerful than the other sub-ALUs or one sub-ALU may be more powerful than the other sub-ALUs. For example, a particular sub-ALU may be able to access an immediate in each of the other sub-ALU portions of the VLIW, while the other sub-ALUs cannot. In another example, a particular sub-ALU may be able to access the output of one or more adders or multipliers of one or more sub-ALUs, while the other sub-ALUs cannot. In yet another example, a particular sub-ALU may be able to perform reciprocal operations while the other sub-ALUs cannot. Therefore, the least powerful sub-ALU may be disabled so that all operations are still available. Alternative, the more powerful sub-ALU may consume more power and yet the addition operations that the more powerful sub-ALU can perform may not be needed and is therefore disabled to conserve more power.

In one implementation, the one or more given sub-ALUs may be disabled by disregarding or dropping the output of the given sub-ALU. In another implementation, the one or more given sub-ALUs may be disabled by not clocking data through the given sub-ALU, and thereby saving power. In yet another implementation, the one or more given sub-ALUs may be disabled by turning off power to the one or more given sub-ALUs.

At 630, one or more blocks of the VLIW corresponding to the one or more given sub-ALUs that are disabled are made available to one or more other sub-ALUs as one or more immediates. Therefore, the VLIW is coupled to the one or more multiplexers and demultiplexers for controlling multiplexing and demultiplexing. In addition, the VLIW is also coupled to the one or more multiplexers as immediates for sourcing to inputs of the sub-ALUs. At 640, the active sub-ALUs are configured and controlled according to the VLIW. The configuration and control may include sourcing a portion of the VLIW corresponding to the one or more disabled sub-ALUs as one or more immediates to one or more of the active sub-ALUs. The immediates are advantageously available immediately to the active sub-ALUs to perform operations upon, instead of having to placing them first into a register before being able to use the immediates.

Figure 7A:
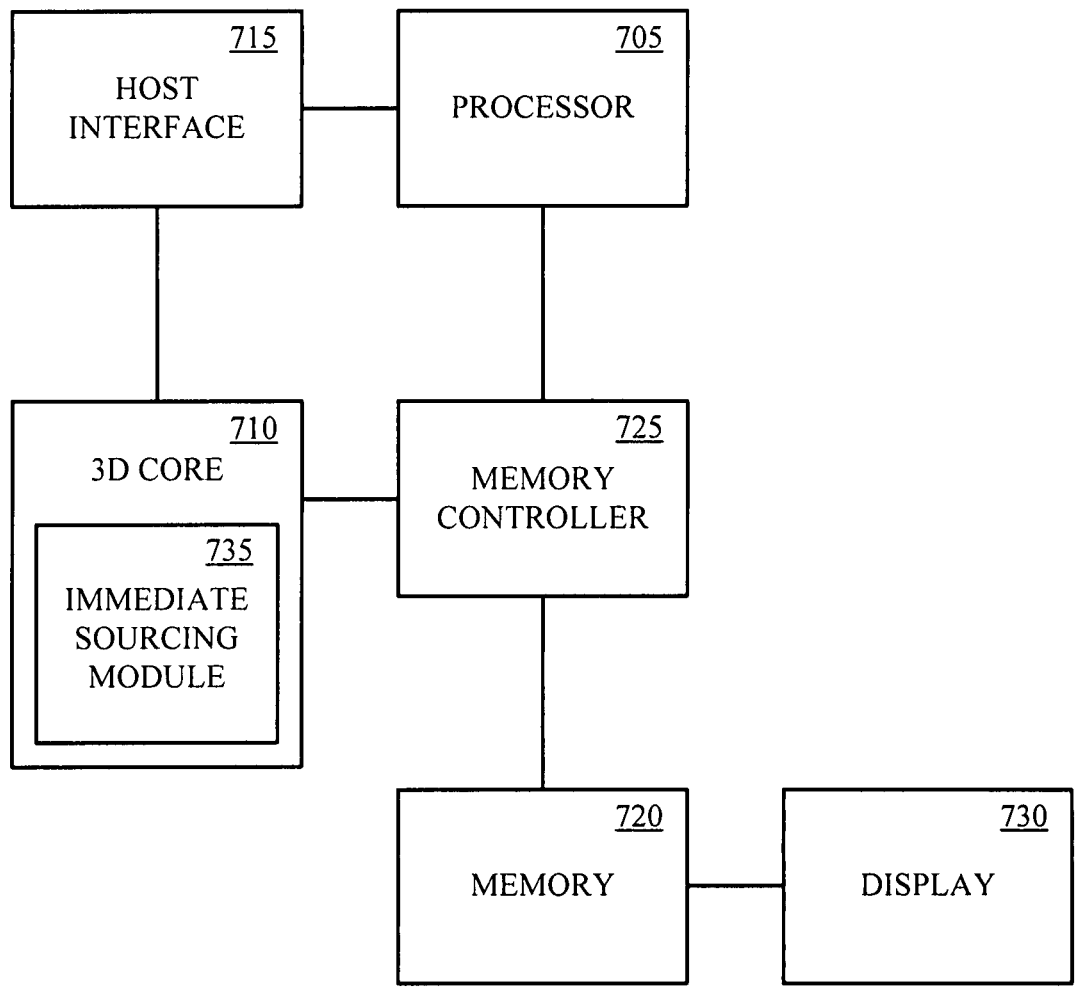
FIG. 7A shows a block diagram of a computer system in accordance with one embodiment of the present technology.
Figure 7B:
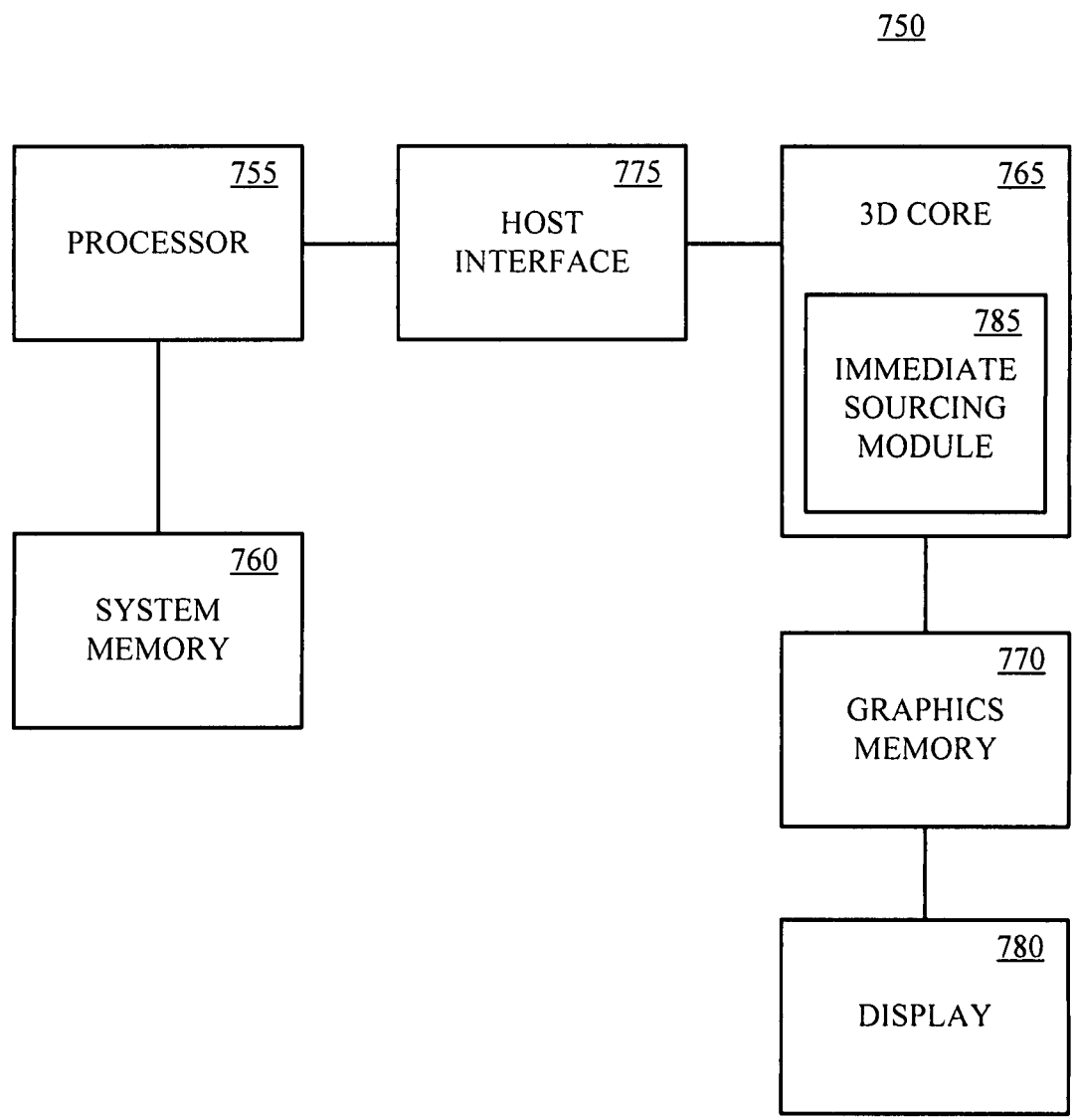
FIG. 7B shows a block diagram of a computing system in accordance with another embodiment of the present technology.

FIGS. 7A and 7B show computer systems, in accordance with embodiments of the present technology. Such computer systems provide the execution platform for implementing certain functionality of the present technology. As depicted in FIG. 7A, the computer system 700 includes a CPU 705 coupled to a 3-D processor 710 via a host interface 715. The host interface translates data and commands passing between the CPU and the 3-D processor into their respective formats. Both the CPU and the 3-D processor are coupled to a memory 720 via a memory controller 725. In one embodiment, the memory is a shared memory, which refers to the property whereby the memory stores instructions and data for both the CPU and the 3-D processor. Access to the shared memory is through the memory controller. The shared memory also stores data comprising a video frame buffer which drives a coupled display 730. The 3-D core includes an immediate sourcing module 735. The immediate sourcing module sources immediates from a VLIW, as described above.

FIG. 7B shows a computer system 750 in accordance with one alternative embodiment of the present technology. The computer system is substantially similar to computer system of FIG. 7A. Computer system, however, utilizes the processor 755 having a dedicated system memory 760, and the 3-D processor 765 having a dedicated graphics memory 770. Host interface 775 translates data and commands passing between the CPU and the 3-D processor into their respective formats. In the system embodiment, the system memory stores instructions and data for processes/threads executing on the CPU and graphics memory stores instructions and data for those processes/threads executing on the 3-D processor. The graphics memory stores data in a video frame buffer which drives the display 780. The 3-D core includes an immediate sourcing module 785. The immediate sourcing module sources immediates from a VLIW, as described above.

The computing systems may, for example, portable phones, PDAs, handheld gaming devices, and the like. In such embodiments, components would be included that are designed to add peripheral buses, specialized communications components, support for specialized IO devices, and the like. Furthermore, it should be appreciated that one or more of the components of either of the computer systems can be integrated onto a single integrated circuit die.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method of performing arithmetic and logic operations comprising:
    determining if an instruction sub-instruction expansion condition exists for a very long instruction word from a source field of a given sub-instruction of the very long instruction word and not an opcode field;
    minimizing operation of a portion of a first arithmetic logic unit component if the sub-instruction expansion condition exists; and
    expanding a part of a second arithmetic logic unit component by utilizing a block of the very long instruction word, normally utilized by the first arithmetic logic unit component, for the second arithmetic logic unit component if the sub-instruction expansion condition exists.

2. The method according to claim 1, wherein expanding the part of the second arithmetic logic unit component comprises sourcing a block of the very long instruction word, normally used to configure and control the first arithmetic logic unit component, as one or more immediates for input to the second arithmetic logic unit component.

3. The method according to claim 1, wherein determining if the sub-instruction expansion condition exists comprises determining if the source field of the given sub-instruction includes an encoding indicating that the very long instruction word includes one or more immediates.

4. The method according to claim 3, wherein minimizing operation of the portion of the first arithmetic logic unit component includes disabling a given sub-ALU if the very long instruction word includes an immediate.

5. The method according to claim 4, wherein expanding a part of a second arithmetic logic unit component comprises:
    making a block of the very long instruction word, corresponding to the given sub-ALU that is disabled, available to one or more other sub-ALUs as one or more immediates; and
    configuring and controlling each active sub-ALU according to the very long instruction word.

6. A processing stage comprising:
    an arithmetic logic unit;
    a plurality of registers;
    a deselector for selectively coupling specified outputs of the arithmetic logic unit to specified ones of the plurality of registers as a function of a very long instruction word; and
    a selector for selectively coupling an immediate to a specified one of a plurality of inputs of the arithmetic logic unit if a source field and not an opcode field of a given sub-instruction of the very long instruction word indicates that one or more other sub-instructions include the immediate.

7. The processing stage of claim 6, wherein:
    the arithmetic logic unit includes a plurality of sub-ALUs; and
    the selector includes a plurality of demultiplexers, wherein each demultiplexer is adapted to selectively couple one of a plurality of registers or the immediate in the very long instruction word to a given input of a corresponding sub-ALU as a function of the very long instruction word.

8. The processing stage of claim 7, wherein one or more of the plurality of sub-ALUs are adapted to be selectively disabled as a function of the very long instruction word.

9. The processing stage of claim 7, wherein each sub-ALU includes a multiplier and an adder.

10. A method of configuring and controlling an arithmetic logic unit (ALU) comprising:
    determining from a source field of a given sub-instruction of a very long instruction word if one or more other sub-instructions of the very long instruction word include one or more immediates, and not from an opcode field of the very long instruction word;
    disabling one or more given sub-ALUs, if the very long instruction word includes one or more immediates;
    making a block of the very long instruction word, corresponding to the given sub-ALUs that are disabled, available to one or more active sub-ALUs as the one or more immediates; and
    configuring and controlling calculations in each active sub-ALU according to the very long instruction word.

11. The method according to claim 10, wherein determining if the very long instruction word includes one or more immediates includes determining if one or more predetermined bits of the source field of the given sub-instruction are set to a given state indicating that the very long instruction word includes the one or more immediates.

12. The method according to claim 10, wherein any one of a plurality of sub-ALUs is disabled if the very long instruction word includes one or more immediates.

13. The method according to claim 10, wherein a particular sub-ALU is disabled if the particular sub-ALU is easier to disable than the other sub-ALUs.

14. The method according to claim 10, wherein a particular sub-ALU is disabled if the particular sub-ALU is less powerful than the other sub-ALUs.

15. The method according to claim 10, wherein a particular sub-ALU is disabled if the particular sub-ALU is more powerful than the other sub-ALUs and the additional processing power of the particular sub-ALU is not needed.

16. The method according to claim 10, wherein the one or more given sub-ALUs are disabled by disregarding or dropping the output of the one or more given sub-ALUs.

17. The method according to claim 10, wherein the one or more given sub-ALUs are disabled by not clocking data through the one or more given sub-ALUs.

18. The method according to claim 10, wherein the one or more given sub-ALUs are disabled by turning power off to the one or more given sub-ALUs.

19. The method according to claim 10, wherein the block of the very long instruction word corresponding to one or more given sub-ALUs that are disabled each include up to three immediates.

\* \* \* \* \*